United States Patent

Wilson

(10) Patent No.: US 6,766,058 B1
(45) Date of Patent: Jul. 20, 2004

(54) PATTERN RECOGNITION USING MULTIPLE TEMPLATES

(75) Inventor: Stephen S. Wilson, Ann Arbor, MI (US)

(73) Assignee: Electro Scientific Industries, Portland, OR (US)

(*) Notice: Subject to any disclaimer, the term of this patent is extended or adjusted under 35 U.S.C. 154(b) by 0 days.

(21) Appl. No.: 09/366,905

(22) Filed: Aug. 4, 1999

(51) Int. Cl.$^7$ ................................................ G06K 9/64
(52) U.S. Cl. ........................ 382/217; 382/160; 348/130
(58) Field of Search ........................ 382/209, 155–160, 382/199–200, 217, 103, 218, 219, 151; 348/129, 130, 91

(56) References Cited

U.S. PATENT DOCUMENTS

| | | | | |
|---|---|---|---|---|
| 4,027,284 A | * | 5/1977 | Hoshino et al. | 382/217 |
| 4,179,685 A | * | 12/1979 | O'Maley | 382/135 |
| 4,641,350 A | * | 2/1987 | Bunn | 382/124 |
| 4,648,053 A | * | 3/1987 | Fridge | 382/147 |
| 4,658,428 A | * | 4/1987 | Bedros et al. | 382/216 |
| 4,914,708 A | * | 4/1990 | Carpenter | 382/14 |
| 5,063,603 A | * | 11/1991 | Burt | 382/115 |
| 5,280,530 A | * | 1/1994 | Trew et al. | 382/103 |
| 5,319,721 A | * | 6/1994 | Chefalas et al. | 382/160 |
| 5,398,292 A | * | 3/1995 | Aoyama | 382/22 |
| 5,544,260 A | * | 8/1996 | Chefalas et al. | 382/187 |
| 5,757,956 A | * | 5/1998 | Koljonen et al. | 382/151 |
| 5,768,413 A | * | 6/1998 | Levin et al. | 382/173 |
| 5,809,171 A | * | 9/1998 | Neff et al. | 382/103 |
| 6,023,530 A | * | 2/2000 | Wilson | 382/219 |
| 6,044,165 A | * | 3/2000 | Perona et al. | 382/103 |
| 6,058,206 A | * | 5/2000 | Kortge | 382/159 |
| 6,067,374 A | * | 5/2000 | Fan et al. | 382/135 |
| 6,075,895 A | * | 6/2000 | Qiao et al. | 345/863 |
| 6,094,501 A | * | 7/2000 | Beatty | 382/154 |
| 6,108,033 A | * | 8/2000 | Ito et al. | 348/152 |
| 6,154,559 A | * | 11/2000 | Beardsley | 340/576 |
| 6,185,330 B1 | * | 2/2001 | Hirao | 382/181 |
| 6,185,724 B1 | * | 2/2001 | Ochotta | 716/16 |
| 6,259,815 B1 | * | 7/2001 | Anderson et al. | 382/218 |
| 6,295,367 B1 | * | 9/2001 | Crabtree et al. | 382/103 |
| 6,298,149 B1 | * | 10/2001 | Nichani et al. | 382/149 |
| 6,393,137 B1 | * | 5/2002 | Chen et al. | 382/103 |
| 6,421,463 B1 | * | 7/2002 | Poggio et al. | 382/224 |
| 6,493,465 B2 | * | 12/2002 | Mori et al. | 382/209 |

FOREIGN PATENT DOCUMENTS

| | | | |
|---|---|---|---|
| JP | WO 97/18524 | * | 5/1997 |
| WO | WO 97/18524 | | 5/1997 |

OTHER PUBLICATIONS

Stephen S. Wilson, Vector Morphology and Iconic Neural Networks, Stephen S. Wilson, *IEEE Transactions on Systems, Man, and Cybernetics,* vol. 19, No. 6, Nov./Dec. 1989, pp. 1636–1644.

Stephen S. Wilson, Teaching Network Connections for Real-Time Object Recognition, Chapter 5, pp. 135–160.

* cited by examiner

*Primary Examiner*—Samir Ahmed
*Assistant Examiner*—Anand Bhatnagar
(74) *Attorney, Agent, or Firm*—Young & Basile P.C.

(57) ABSTRACT

The present invention solves the problem of repeated operator intervention in a vision system by providing multiple templates which may be used to locate an object within an image.

7 Claims, 5 Drawing Sheets

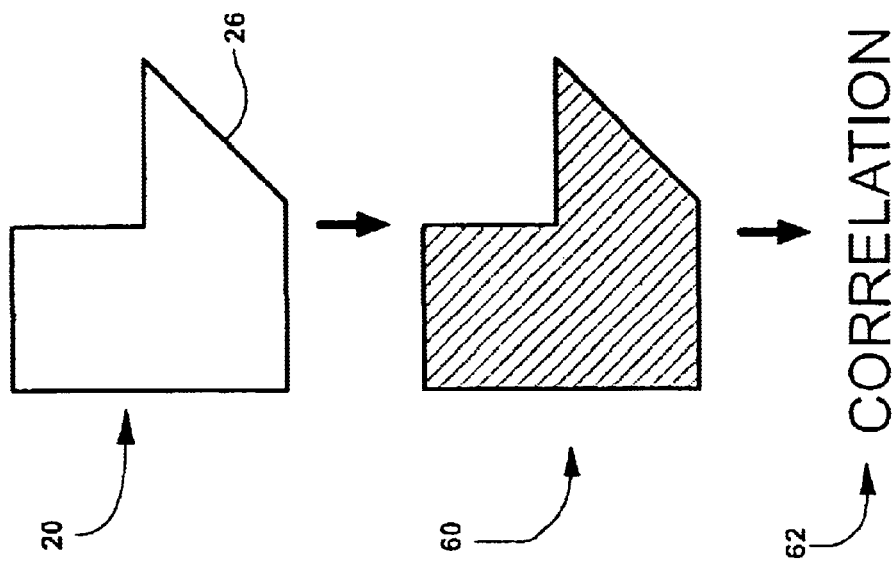
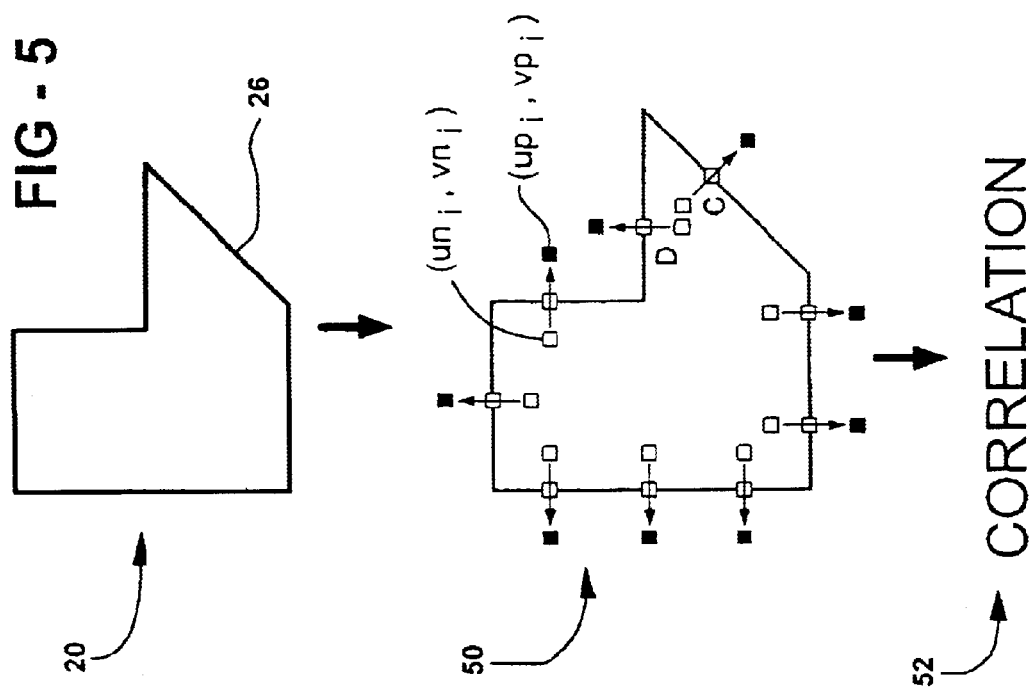

| VECTOR # N | $u_i$ | $v_i$ | $\theta_i$ |
|---|---|---|---|
| A | 5 | 0 | 270 |
| B | 12 | 0 | 270 |
| C | 20 | 5 | 315 |
| D | 17 | 10 | 90 |
| E | 12 | 15 | 0 |
| F | 7 | 20 | 90 |
| G | 0 | 15 | 180 |
| H | 0 | 10 | 180 |
| I | 0 | 5 | 180 |

PATTERN RECOGNITION USING MULTIPLE TEMPLATES

FIELD OF THE INVENTION

The present invention relates to a system for image processing and deals more particularly with a system for automatically locating patterns.

BACKGROUND OF THE INVENTION

Digital image processing is widely used in many industrial applications for locating articles during automated manufacture and directing equipment to operate on those articles. One example is a wire bonding application. Wire bonding describes the process of bonding discrete wires to an integrated circuit chip. Digital image processing can be used to locate the chip, to locate the wire on a chip, and to direct the wire bonder to bond the wire to the appropriate location on the chip.

In any automated manufacturing application including the wire bond application, the first procedure employed by the operator is to train the image processing system on a pattern on a chip. The pattern may be thought of as an object. This is done in a wide variety of ways including automatic and manual procedures. The training process creates a standard template or kernel that can be later used to locate the object or pattern within an image. In most commercial systems after the standard template is trained, the image processing system uses a pattern recognition technique to locate the same object within subsequent images and performs predetermined tasks. If during a production run the system fails to locate the object within an image of a manufactured part with the standard template, the system will initiate an operator assist call. An operator assist call is a warning signal that the image processing system was unable to locate the object in the manufactured part with the standard template. The operator then manually determines whether there is a failure, or whether the manufactured part is valid and the vision system failed. If the problem was caused by a valid manufactured part that has a substantial difference in appearance from the original part, the operator must manually direct the system to the correct location.

If an operator is unable to immediately attend to the alarm the system will stop operation. With the ever increasing output requirements for manufacturing systems any delays in production can be costly. Therefore, a need has arisen to solve the problem of unnecessary operator assist calls.

SUMMARY OF THE INVENTION

One aspect of the present invention provides for a method of locating an object within a series of images including providing a first template representative of an object within a standard image. The first template is applied to an image within the series to locate the object. If the first template is unable to locate the object within the subsequent image, another template is applied to determine if a match exists.

It is recognized that a variety of pattern recognition techniques could be used in applying the present invention. These pattern recognition techniques include but are not limited to binary vector correlation, gray scale vector correlation, and gray scale correlation. It is also recognized that the template can be provided in a number of ways, both automatic and manual. The training methods include but are not limited to techniques that involve simulated annealing, random sampling, subsampling, equidistant sampling along edges or sampling on a coarse grid.

BRIEF DESCRIPTION OF THE DRAWINGS

FIG. 5 is a flow diagram generally illustrating edge pair correlation.

FIG. 8 is a flow diagram illustrating gray scale correlation.

DESCRIPTION OF THE PREFERRED EMBODIMENTS OF THE INVENTION

The terms herein are used with their ordinary meaning as defined in relevant technical dictionary such as those offered by IEEE. Representative definitions are as follows:

Image: An image is a two-dimensional representation of a three-dimensional object; generically described as a picture.

Object: An object may represent particular features within an image or a pattern within an image.

Template: A template represents a unique pattern or coding of a pattern within an image used to locate the object within subsequent images.

Kernel: A specific type of template,which is used in convolutions or correlations.

Pattern recognition technique: An algorithm or function which uses a template to operate on an image to determine whether a match exists. Typically, a match is indicated by a maximum score, or a score which exceeds a defined threshold. The location of the template that gives the maximum score indicates the location of the pattern within the image.

The present invention provides for the use of multiple templates which may be sequentially or simultaneously used to determine whether an object in an image can be found. Additional templates are trained either manually or automatically each time an operator assist is called. Prior to calling an operator assist, the system will utilize all of the trained templates to determine whether a match exists.

During a production run if the object cannot be found by the first trained template, the system will try again with the second trained template. If neither template is able to find the object and the part is valid, a third template is trained during the next operator assist. Eventually all significantly different appearances of the desired object within valid parts will be trained and further operator assists will be eliminated.

The present invention may provide for automatic training of additional templates. This may be done when a pattern recognition score is unique but does not exceed a predetermined threshold. The training of new templates can occur during the manufacturing cycle when the image system is idle and waiting for,the next part or concurrently with other operations as is appreciated by those skilled in the art.

Figure 1:
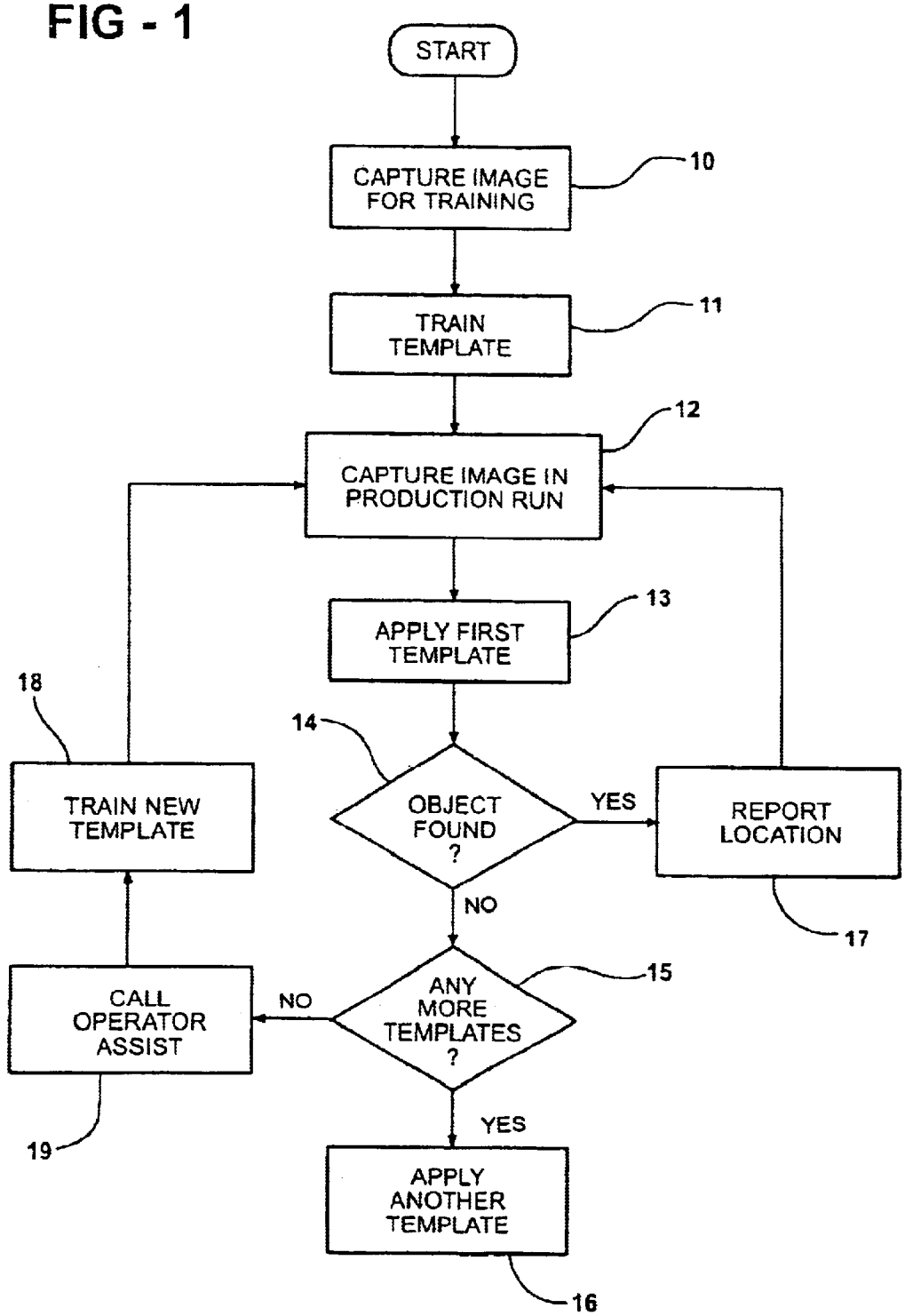
FIG. 1 is a flow diagram that shows a more efficient manner of locating objects in an image including providing multiple templates.

FIG. 1 illustrates a flow diagram of a pattern recognition technique utilizing multiple templates. The technique of FIG. 1 initiates and captures a standard image for training at 10. A first template is trained at 11 from the standard image. The template is based on a unique pattern or object within the standard image. The first of a series of images is then captured at 12. Typically the series of images represents images from a production run. At 13 the first template is applied to the first image in the series. If the object is found at 14 the location is reported at 17 and another image is captured at 12. If the object is not found within the first image, the system determines whether additional templates are available at 15. If no additional templates are available, an operator assist, may be called at 19 and a new template may be trained at 18. If the image is acceptable, the new template is trained at 8. For subsequent images captured at 12, the system will apply all available template at 15 and 16 to find the object. It has been discovered that providing multiple templates can significantly increase the speed at which the manufacturing production system operates.

The present invention can be utilized with any combination of underlying pattern recognition techniques and training techniques. A wide variety of pattern recognition and training techniques can be used to locate objects within images and to train new templates. Available pattern recognition techniques include but are not limited to, binary vector correlation, edge pair correlation, and gray scale correlation. The first step in any pattern recognition system is to create a template used to locate a unique pattern within an image. That template can then be used to locate the object in subsequent images. While not limiting to the present invention, three preferred embodiments are described below which relate to three different pattern recognition techniques.

EXAMPLE No. 1

Binary Vector Correlation Trained by Simulated Annealing

In binary vector correlation the image and selected template are composed of pixels which are characterized by vectors.

Figure 2:
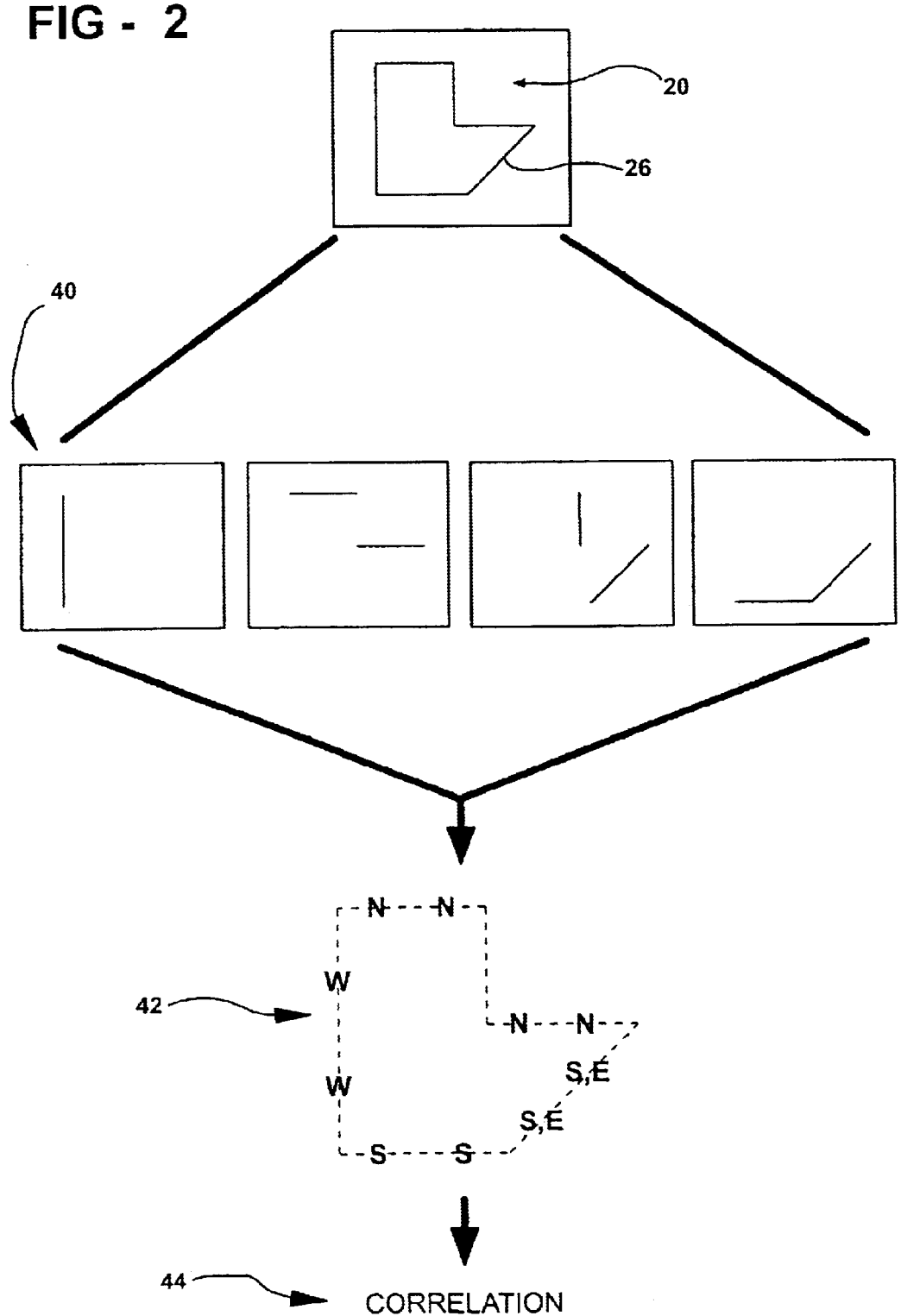
FIG. 2 is a flow diagram generally illustrating binary vector correlation.

Binary vector correlation is generally illustrated in the FIG. 2. The most common form of binary vector correlation consists of transforming a gray level image into several binary images which will be searched. Each composite or binary image represents a vector in the sense that pixels within the image have several components each of which form one of the binary images. In the preferred embodiment of this example, the binary images are characteristic of, for example, the north, south, east, and west edges within the image. A binary vector kernel is a template and defined as having separate binary kernels which may be thought of as vector-kernels.

With reference to FIG. 2 an object 20 is shown taken from an image. Object 20 includes edges 26. Object 20, in binary vector correlation is broken into four binary images at 40. Four separate kernels are then created at 42, which, in this example, represent edges in the north, south, east and west direction (the four separate kernels are shown together in FIG. 2). In binary vector correlation subsequent images are converted into binary images representing north, south, east, and west edges within the image. The four kernels at 42 are then correlated against the four separate binary images at correlation 44 to find object 20. A match is typically indicated by a maximum correlation score derived from the correlation at 40.

The correlation indicated at 44 is described in more detail as follows. The position of the vector kernels are displaced and moved from location to location within the binary image and correlation 44 is applied between each vector and each binary image. Correlation describes the process the sum of the inner products, or dot product, and computed for a pixel in the kernel and a pixel in the image for a corresponding coordinate point. In mathematical terms, the formula for a discrete two-dimensional vector correlation is given by:

$$corr(x, y) = \sum \sum_{uv} I(x-u, y-v) \cdot K(u, v)$$

where I is a vector image and K is a vector-kernel, x and y are image coordinates, and the summation is over a u and v range in the template.

One way of training the binary vector correlation is called simulated annealing. Simulated annealing describes a physical thermodynamic model which can be used to describe the teaching or training of binary vector correlation.

With reference to FIG. 2, the features within an image include corresponding edge segmentations in the four cardinal directions. Edges 26 of object 20 are made up of pixels. An image may include additional edge pixels beyond those shown in object 20. Any of the possible edge pixels could be used as unique features for locating subsequent images. That is, a kernel made up of any of the points in the edges of an image could be used to identify the same or similar features within subsequent images. For high computation speed, it is preferable to use as few points as possible optimizing the kernel according to some criteria. In selecting these few points for the kernel, edges that define different features within an image can be characterized as quantum states.

In the simulated annealing construct a number m of candidate points characterized by molecules are chosen from quantum states to ensure the valid features are always used in the kernel. The m molecular positions are the set of vectors of points that define the kernel. The objective of training is to choose kernel points that will minimize false correlations from any other features in the image. Thus, the major goal is to find kernel points chosen from the quantum states that will give the lowest false recognition rate.

First, m random kernel points, or molecules are chosen from the set of allowed edge points, or quantum states. Then a sequence of trials is conducted. A particular set of molecules are related to those in the previous trial in the sense that each molecule has moved somewhere in the neighborhood of the corresponding molecule in the previous trial. The size of the neighborhood of movement from which new trial molecules are chosen can be characterized as the temperature. The relation of temperature to this definition of molecular movement from one time increment to the next results in a simple physical picture: the degree of movement is analogous to the average kinetic energy of the system, which is related to physical temperature. Thus, a high temperature means that molecules can be displaced large distances from one trial to the next. A low temperature means that there is only a slight difference from the previous configuration.

Figure 3:
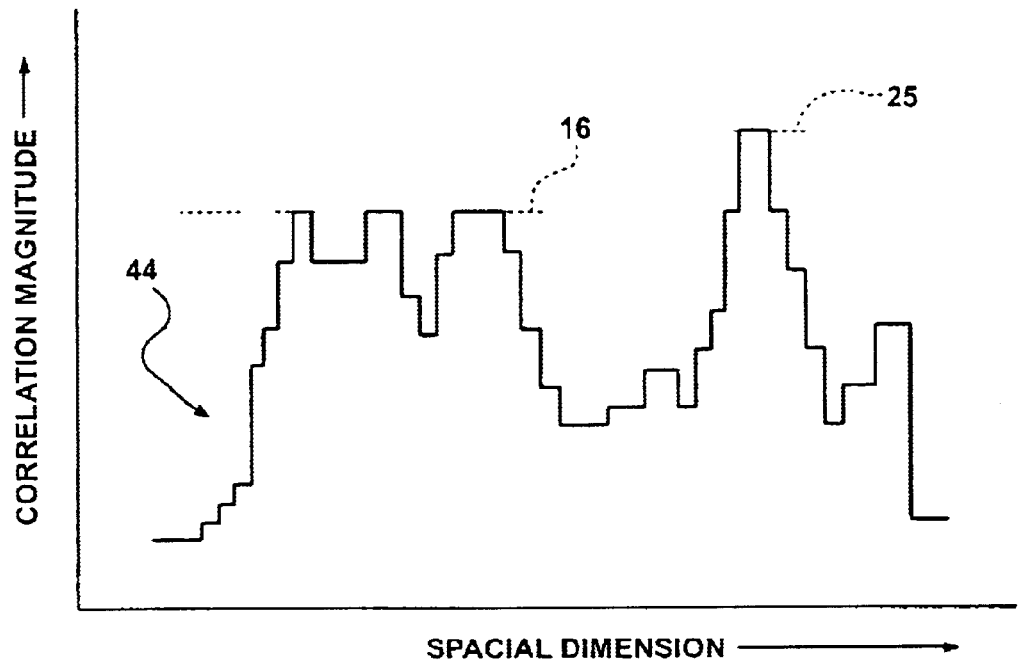
FIG. 3 is an example of an image cross section of net values for the simulated annealing training technique.
Figure 4:
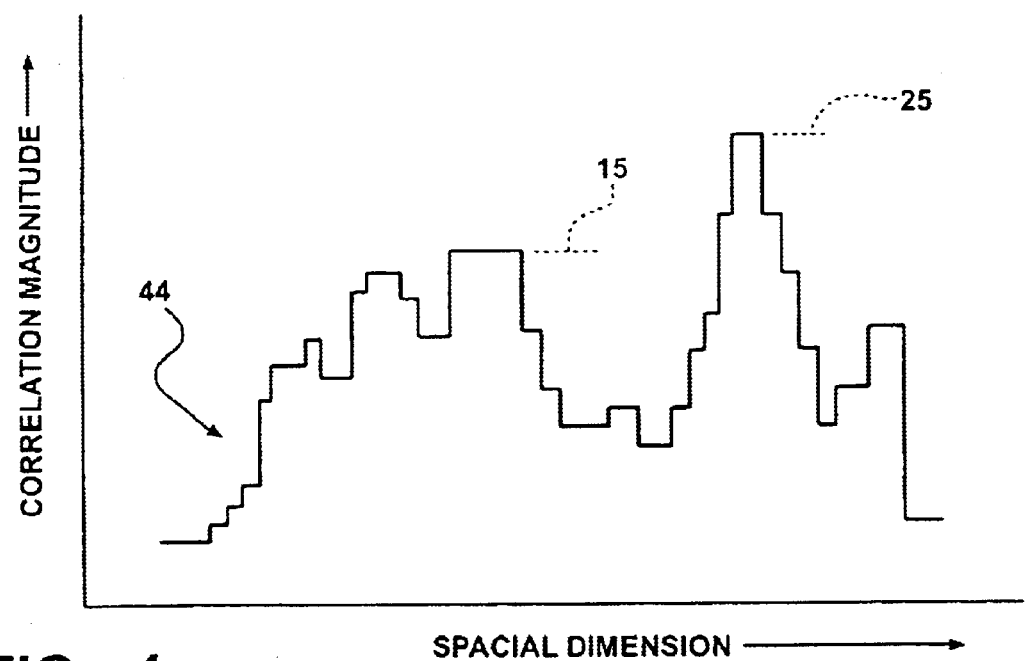
FIG. 4 represents different molecular states for the simulated annealing training technique

The idea of annealing is to reduce internal stress energy in a system. Within the analogy of simulated annealing, the potential energy of the system is defined to be the maximum correlation value in the image, except for the value that corresponds to the object being trained. These large values correspond to potential false recognition. With this definition, simulated annealing will reduce false recognitions. FIGS. 3 and 4 show two examples of the correlation value along some spatial dimension. In these examples, there are twenty-five kernel points. Each cross section includes a peak at the features being trained (value, 25) along with a few false near recognitions. FIGS. 3 and 4 represent different molecular states of the system. In FIG. 3, the largest false recognition has a value of sixteen, and there are six image positions with that value. Thus the system energy has the value sixteen. FIG. 4 represents a different molecular state that has an energy value fifteen, and only two image positions have that value. The molecular state resulting in FIG. 4 is a better choice because there is less chance of false recognition.

The trained kernel based on simulated annealing can then be used with binary vector correlation to locate an object within an image. As a matter of background, binary vector correlation and the teaching of binary vector correation are described in greater detailed "Vector Morphology and Iconic Neural Net5words: by S. S. Wilson in IEEE Transactionsion Systems, Man, Cybernetics, November/December 1989, Volume 19, No. 6, pages 1636–1644 and "Teaching Network for Real Time Object Recognition" by S. S. Wilson in Neural and Integration Systems Integration, pages 135–160, Wylie Interscience 1991, which are incorporated herein by reference.

During a production run the system may indicate a failure requiring an operator assist. In the first preferred embodiment, an operator would visually inspect to see if the manufactured part was unacceptable or whether there was a visual deviation within the image. If the part was acceptable, the operator may use simulated annealing to train a second kernel which can be used later. In addition, if a correlation is poor but still valid, a new kernel may be automatically trained on the errant image and the new kernel will be added to the list of currently used kernels.

During further assembly line running, if the system does not respond adequately to the first kernel the other kernels are applied until a correlation is found. If a correlation is not found, then an "operator assist" is called and either a new kernel is trained or the manufactured part is rejected.

EXAMPLE No. 2

Edge Pair Correlation with Manual or Automatic Training

Another pattern recognition technique is described as edge pair correlation. Edge pair correlation generically illustrated in FIG. 5 and is described in co-pending U.S. patent application Ser. No. 08/556,367, which is incorporated herein by reference. Edge pair correlation utilizes a kernel constructed of pairs of points which straddle the edges of an object or unique pattern. The kernel is correlated directly against a gray scale image to determine whether a match exists. As illustrated in FIG. 5 an edge pair template is shown at 50. The edge pair template is trained from the features in object 20 taken from an image.

Figures 6, 7:
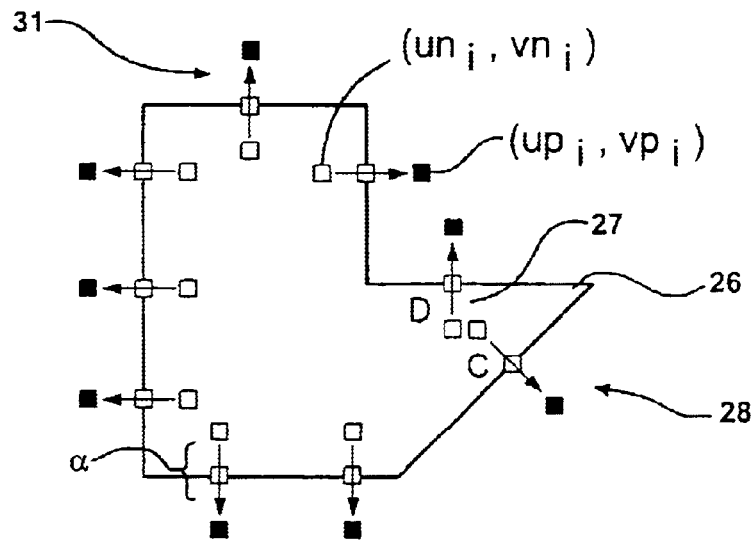
FIG. 6 is a schematic illustration of vector sets for edge pair correlation.
FIG. 7 is a listing of values for an abstract template.

As shown in FIGS. 5 and 6 the edge points may be illustrated using coordinates of $(un_i, vn_i)$, $(up_i, vp_i)$ Edge pair correlation is advantageous because it correlates a sparse kernel directly against the gray scale image. As described in U.S. patent Ser. No. 08/556,367, and illustrated in FIG. 6 and shown graphically in FIG. 7 the edge pair template may be translated into an abstract template 28 composed of a series of vectors. The abstract template can be rotated to allow the correlation to search rotated images.

The abstract template is defined by a series of n vectors $(U_1, V_1, \Theta_1) (U_2, V_2, \Theta_2) \ldots (U_N, V_N, \Theta_N)$ which are easily stored in computer memory locations. As shown schematically in FIG. 6 and graphically in FIG. 7, each vector is given a set of coordinate points, u and v which are respectively the horizontal and vertical coordinates $(u_i, v_i)$ of kernel edges along with an angle $\Theta$.

As shown in FIGS. 6 and 7 associated with each coordinate point is an edge direction illustrated by a corresponding arrow that is perpendicular to the corresponding edge 26 and the location of the coordinate point. The tail of each arrow 27 lies inside the boundary defined by edges 26 while the head 31 of each arrow lies outside the boundary.

The abstract template can be converted to the edge pair kernel by defining negatively weighted coordinate points $(un_i, vn_i)$ and positively weighted points $(up_i, vp_i)$ at an angle $\Theta_i$ for each vector $(Ui, V_i, \Theta_i)$ of the abstract template. As shown in FIG. 6, the pair of coordinate points are displaced from one another by a positive displacement $\alpha$. The distance $\alpha$ may be modified to provide for a more general or more accurate correlation.

As shown in FIG. 5 the edge pair kernel 50 is correlated against the gray scale images at 52. The preferred correlation is as follows:

$$corr(x, y) = \sum_i I(x - up_i, y - vp_i) - \sum_i I(x - un_i y - vn_i)$$

The correlation value indicates whether a probable match exits.

Edge pair correlation may be trained in a variety of ways. One way is manual training where an operator manually selects edge pair points $(U_i, V_i, \alpha)$. These are then correlated against the image. It is also recognized that a variety of automatic techniques are available. These automatic techniques could involve use of a equidistant sampling along edges or sampling on a coarse grid to select edge pair combinations within a kernel. The edge pair points within the kernel could also be selected at random.

In the present invention, a kernel is trained and edge pair correlation is applied. If an unacceptable correlation score was determined, the present invention provides that a new alternate kernel would be trained. Thereafter, if a first kernel does not provide a satisfactory correlation score, alternate kernels may be tried to determine if a match exists. The invention may also provide that alternate kernels may be automatically tried where a correlation based on a first kernel is unique but not sufficient.

EXAMPLE No. 3

Gray Scale Correlation with Either Manual or Automatic Training

The present invention may also be applied in the context of gray scale correlation with any automatic or manual training technique. Gray scale correlation describes the use of all the gray level pixels within an object in an image. Another common concept for gray scale correlation is normalized cross correlation. Gray scale correlation is generally illustrated in FIG. 8. As shown in FIG. 8, the kernel in a gray scale correlation is shown at 60 and is correlated against a gray scale image at 62 to determine whether a probable match exists.

Because gray scale correlation does not select a subset of pixel points from an image, the kernel itself need not be trained in the same sense as with binary vector correlation or edge pair correlation. However, the object from which the kernel is based needs to be selected. This can either be done manually or automatically. Manual selection would involve choosing the same object which has a different appearance in the image.

In the present invention gray scale correlation could be applied using a first kernel and if the operation does not yield a sufficient correlation score alternate kernels could be trained on the new appearance with the object at the same position.

It is understood that the above examples are only representative and that the invention encompasses use of any pattern recognition technique with any training technique. The present invention provides that alternate kernels may be trained and subsequently applied when the initially trained kernel does not yield a sufficiently large correlation value.

By providing multiple templates, the present invention increases the speed at which images may be located by reducing manual operator assistance.

What is claimed is:

1. A method of locating a first object within a series of images comprising:

providing a first template representative of the first object;

applying the first template to the first image within a series of images;

reporting the location of the first object if the first object is found within the first image;

training an additional template from the first image if the first object is not located in the first image by the first template, the additional template being characteristic of the first object, the first and additional template forming a collection of templates;

applying the first template to a subsequent image to find the first object;

determining if an additional template is available from the collection of templates if the first template does not find the first object in the subsequent image, and;

applying the additional template to the subsequent image to find the first object.

2. A method as in claim 1 wherein the template is a kernel applied by binary vector correlation.

3. A method as in claim 1 wherein the kernel is trained using simulated annealing.

4. A method as in claim 1 wherein the kernel represents pairs of points straddling an edge and the kernel is applied using gray scale vector correlation.

5. A method as in claim 1 wherein the additional template is trained in response to an operator assist call.

6. A method as in claim 1 wherein additional template is trained without manual assistance.

7. A method as in claim 1 wherein only one additional template is trained for each operator assist.

* * * * *